United States Patent
Moore (10) Patent No.: US 9,346,503 B2
(45) Date of Patent: May 24, 2016

(54) TRAILER FOR TRANSPORTING A PORTABLE STRUCTURE

(76) Inventor: Jeffrey O. Moore, Boise, ID (US)

( * ) Notice: Subject to any disclaimer, the term of this patent is extended or adjusted under 35 U.S.C. 154(b) by 961 days.

(21) Appl. No.: 13/094,753

(22) Filed: Apr. 26, 2011

(65) Prior Publication Data

US 2011/0266763 A1 Nov. 3, 2011

Related U.S. Application Data

(60) Provisional application No. 61/330,575, filed on May 3, 2010.

(51) Int. Cl.
*B62D 63/06* (2006.01)

(52) U.S. Cl.
CPC .................................. *B62D 63/062* (2013.01)

(58) Field of Classification Search
CPC ............................ B62D 65/024; B62D 63/062
USPC .................. 280/656, 46, 43.1, 43.24, 47.131, 280/47.17, 47.19, 47.2, 47.24, 47.26
See application file for complete search history.

(56) References Cited

U.S. PATENT DOCUMENTS

| | | | | |
|---|---|---|---|---|
| 1,363,499 A * | 12/1920 | Davis | ............................ | 414/447 |
| 1,681,944 A * | 8/1928 | Marshall, Jr. | ................... | 414/457 |
| 1,779,887 A * | 10/1930 | Melanson | ........................ | 280/63 |
| 1,924,885 A * | 8/1933 | Schreck | ........................ | 414/434 |
| 2,171,068 A * | 8/1939 | Masters | ....................... | 280/47.18 |
| 2,174,063 A * | 9/1939 | Richards | ......................... | 280/482 |
| 2,341,939 A * | 2/1944 | Miller | ............................ | 414/485 |
| 2,468,914 A * | 5/1949 | Banaszak et al. | ................ | 280/40 |
| 2,507,855 A * | 5/1950 | Drew | ................................ | 280/63 |
| 2,711,330 A * | 6/1955 | Frye | ............................ | 280/47.26 |
| 3,035,847 A * | 5/1962 | Born | .............................. | 280/654 |
| 3,119,629 A * | 1/1964 | De Puydt et al. | ......... | 280/124.11 |
| 3,199,889 A * | 8/1965 | Gadbury | ........................ | 280/656 |
| 3,323,778 A * | 6/1967 | Baker | ......................... | 296/26.05 |
| 3,325,182 A * | 6/1967 | Kelley | ........................ | 280/47.19 |
| 3,368,827 A * | 2/1968 | Dashew | ........................ | 280/401 |
| 3,377,085 A * | 4/1968 | Fralick | ........................... | 280/408 |
| 3,403,924 A * | 10/1968 | Oliveira | .......................... | 280/63 |
| 3,596,974 A | 8/1971 | Adams | | |
| 3,695,673 A | 10/1972 | Meadows | | |
| 3,722,948 A * | 3/1973 | Walsh et al. | ................... | 296/35.3 |
| 3,731,831 A | 5/1973 | Huff | | |
| 3,768,854 A | 10/1973 | Johnson | | |
| 3,817,556 A * | 6/1974 | Nyman | .......................... | 280/400 |
| 3,854,747 A * | 12/1974 | Johnston | ........................ | 280/659 |
| 3,877,723 A * | 4/1975 | Fahey et al. | .................... | 280/204 |
| 4,119,224 A * | 10/1978 | Moody | .......................... | 414/537 |
| 4,126,324 A * | 11/1978 | Browning | ........................ | 280/42 |
| 4,261,613 A * | 4/1981 | Alford | ........................... | 296/156 |

(Continued)

FOREIGN PATENT DOCUMENTS

FR 2676698 A1 * 11/1992 ............... B62D 7/20

*Primary Examiner* — J. Allen Shriver, II
*Assistant Examiner* — Jacob Meyer
(74) *Attorney, Agent, or Firm* — Robert L. Shaver; Shaver & Swanson, LLP (57) ABSTRACT

A trailer for use primarily for transporting a portable structure in which a frame is mounted on an undercarriage with the wheels of the undercarriage near the longitudinal center and the portable structure is positioned at an angle to reduce wind resistance while the structure is being transported on the trailer. The portable structure is secured to the trailer by placing the skid plates of the portable structure under frame elements affixed to the trailer frame.

9 Claims, 7 Drawing Sheets

(56) References Cited

U.S. PATENT DOCUMENTS

| | | | |
|---|---|---|---|
| 4,366,933 A * | 1/1983 | Broussard | 242/557 |
| 4,380,836 A * | 4/1983 | Braxton | 4/460 |
| 4,454,613 A * | 6/1984 | Palmer | 4/300 |
| 4,488,735 A * | 12/1984 | Hehr | 280/656 |
| 4,653,125 A | 3/1987 | Porter | |
| 4,685,855 A * | 8/1987 | Celli | 414/482 |
| 4,807,894 A | 2/1989 | Walker | |
| D322,235 S | 12/1991 | Bell | |
| 5,098,113 A * | 3/1992 | Albitre | 280/204 |
| 5,183,293 A * | 2/1993 | Julian | 280/430 |
| 5,340,145 A * | 8/1994 | Leib et al. | 280/656 |
| 5,443,131 A * | 8/1995 | Bartlett | 188/3 R |
| 5,548,856 A * | 8/1996 | Julian | 4/664 |
| 5,570,898 A * | 11/1996 | Albert | 280/656 |
| 5,607,176 A * | 3/1997 | Leib et al. | 280/656 |
| 5,645,292 A * | 7/1997 | McWilliams et al. | 280/494 |
| 5,692,779 A * | 12/1997 | Hedgepeth | 280/789 |
| D402,923 S | 12/1998 | Neault | |
| D402,924 S * | 12/1998 | Neault et al. | D12/101 |
| D403,276 S * | 12/1998 | Neault et al. | D12/101 |
| 5,860,670 A * | 1/1999 | Aubin | 280/476.1 |
| 6,047,736 A * | 4/2000 | Chiocchio et al. | 137/899 |
| 6,050,577 A * | 4/2000 | Smith | 280/47.24 |
| 6,260,864 B1 * | 7/2001 | Smith | 280/47.26 |
| 6,428,035 B1 * | 8/2002 | Maxwell et al. | 280/656 |
| 6,536,367 B1 * | 3/2003 | Carter | 114/344 |
| 6,575,690 B1 * | 6/2003 | Ansotegui | 414/444 |
| 6,723,173 B1 | 4/2004 | Golladay | |
| 6,955,375 B2 * | 10/2005 | Thurm | 280/656 |
| 6,962,353 B1 * | 11/2005 | Garcia | 280/47.19 |
| 7,004,495 B2 * | 2/2006 | Thurm | 280/656 |
| 7,188,857 B2 * | 3/2007 | Richard et al. | 280/482 |
| 7,219,919 B2 * | 5/2007 | Tipton | 280/651 |
| 7,234,759 B1 * | 6/2007 | Alohali | 296/168 |
| 7,258,362 B2 * | 8/2007 | Thurm | 280/656 |
| 7,350,790 B1 * | 4/2008 | Wilson | 280/47.131 |
| 7,373,757 B2 * | 5/2008 | Hampel | 52/79.1 |
| 7,401,804 B1 | 7/2008 | Rupp | |
| 7,651,104 B1 * | 1/2010 | Hilt | 280/47.131 |
| 8,087,683 B2 * | 1/2012 | James | 280/204 |
| 8,876,148 B2 * | 11/2014 | Sartini | 280/656 |
| 9,051,013 B1 * | 6/2015 | Popa | |
| 2004/0135349 A1 * | 7/2004 | Palmer | 280/656 |
| 2005/0104323 A1 * | 5/2005 | Thurm | 280/491.1 |
| 2005/0236814 A1 * | 10/2005 | Thurm | 280/656 |
| 2007/0046066 A1 * | 3/2007 | Cosgrove et al. | 296/180.4 |
| 2007/0252357 A1 * | 11/2007 | Hoskins | 280/415.1 |
| 2008/0209625 A1 * | 9/2008 | Hampel | 4/479 |
| 2011/0266763 A1 * | 11/2011 | Moore | 280/63 |
| 2012/0167297 A1 * | 7/2012 | Poust | 4/321 |
| 2014/0363263 A1 * | 12/2014 | Zadok et al. | 414/507 |

* cited by examiner

TRAILER FOR TRANSPORTING A PORTABLE STRUCTURE

CROSS-REFERENCE TO RELATED APPLICATIONS

This application claims priority benefit from U.S. Provisional Application No. 61/330,575, filed on May 3, 2010, and is related to the following commonly-owned, co-pending U.S. patent application Ser. No. 12/782,973, filed May 19, 2010, entitled "Fresh Flush Recycling Toilet;"

BACKGROUND

This invention relates to the transport of portable structures, particularly portable toilets. Conventional portable or transportable structures such as portable toilet units are typically used at construction sites, outdoor public events and various other venues where a running water supply is unavailable. These structures generally comprise a housing within which a waste material storage tank is positioned. The housings of the portable toilet are usually made of large sheets of plastic materials which are formed into rear and side walls and a front wall having a doorway and a suitable door, a roof and a floor. The structures are typically light enough to be moved and/or loaded onto a trailer by one person who tips the structure down and slides it into place on the bed of a conventional flat bed trailer.

It is desirable to transport portable toilet structures in an upright position to minimize the likelihood that waste will leak from the collection tank into the interior portion of the housing. Towing one or more portable toilet structures on a trailer presents challenges, particularly in windy conditions due to the shape of the structures and the wind resistance exerted against the housing walls as they are towed at normal driving speeds behind a truck or a car. While wind diverters and other devices have been conceived to help reduce wind resistance while towing using trailers, these devices are clumsy and must be mounted to the towing vehicle or the trailer. Examples of wind diverters can be found in U.S. Pat. No. 3,596,974 to Adams, U.S. Pat. No. 3,695,673 to Meadows and U.S. Pat. No. 3,768,854 to Johnson et al.

Conventional flat bed and other trailer types are unsatisfactory or inconvenient to use for transporting portable toilet or other portable structures because there is no standardized element on a conventional trailer for quickly and easily securing the portable toilet structure to the conventional trailer. Also, the height or covered housing structure of a conventional trailer may make it difficult to load and unload the portable toilet structure. An example of a conventional flat bed trailer is disclosed in U.S. Pat. No. 3,731,831 to Huff. A standard trailer with a housing is disclosed in U.S. Pat. No. 4,807,894 to Walker.

Specialty trailers for towing portable structures are also known. Examples of such trailers are disclosed in U.S. Pat. No. 7,401,804 to Rupp, U.S. Pat. No. 4,653,125 to Porter and U.S. Pat. No. 5,548,856 to Julian.

It is desirable to provide a trailer for transporting one or more portable structures in which it is relatively quick and simple for a portable structure to be loaded onto, secured to and unloaded from a trailer. It is also desirable for the trailer to be designed such that the wind resistance incurred while towing the portable toilet structure at normal driving speeds, particularly on an interstate highway is reduced from the oncoming forward direction of the vehicle and for crosswinds from either side. The invention of the present application addresses these problems and provides an improved trailer for transporting portable structures.

DETAILED DESCRIPTION

Figures 1A, 1B, 1C, 1D:
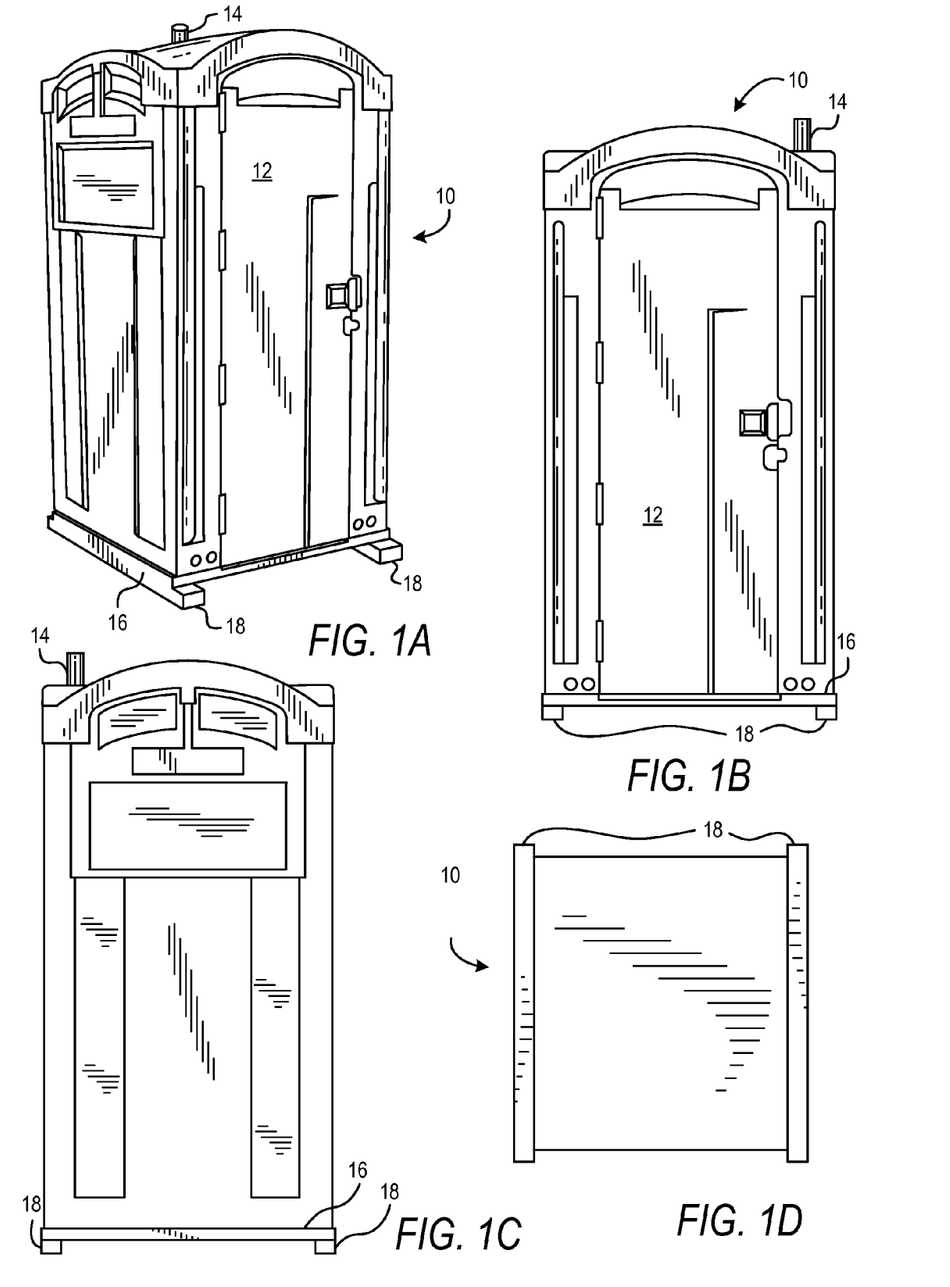
FIGS. 1A-1D show various views of a portable structure.
Figure 2A:
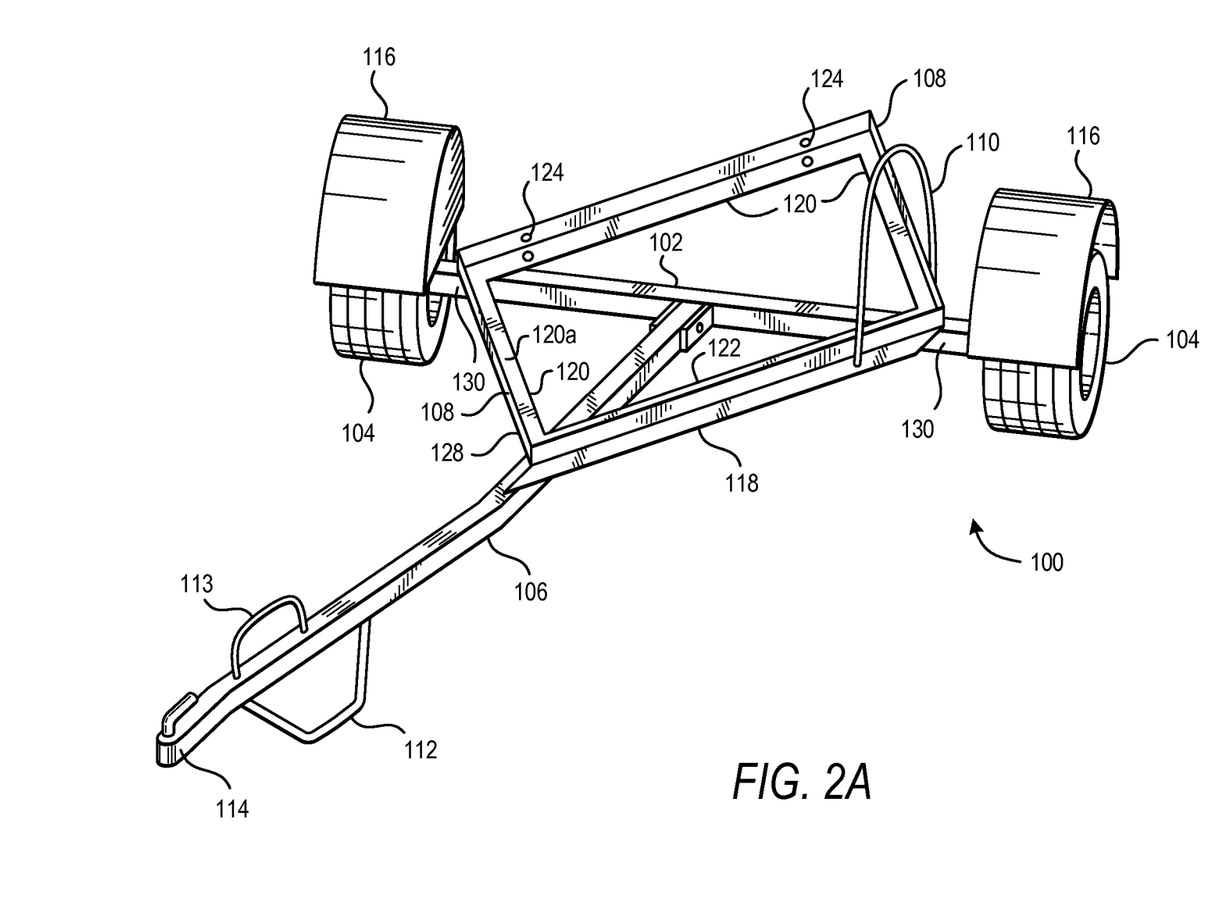
FIG. 2A and FIG. 2B show perspective views of a trailer for transporting a portable structure.
Figure 2B:
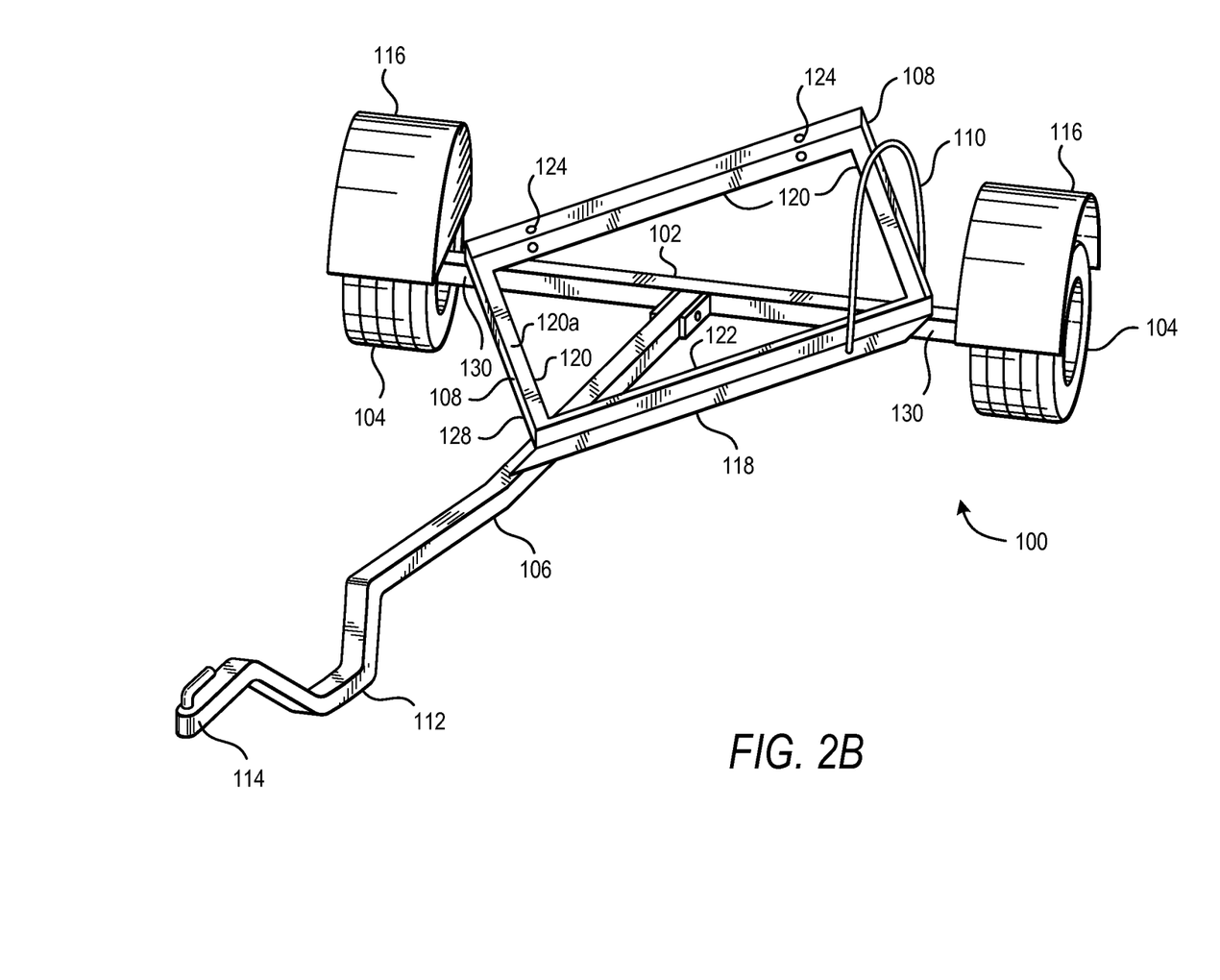
Figure 3:
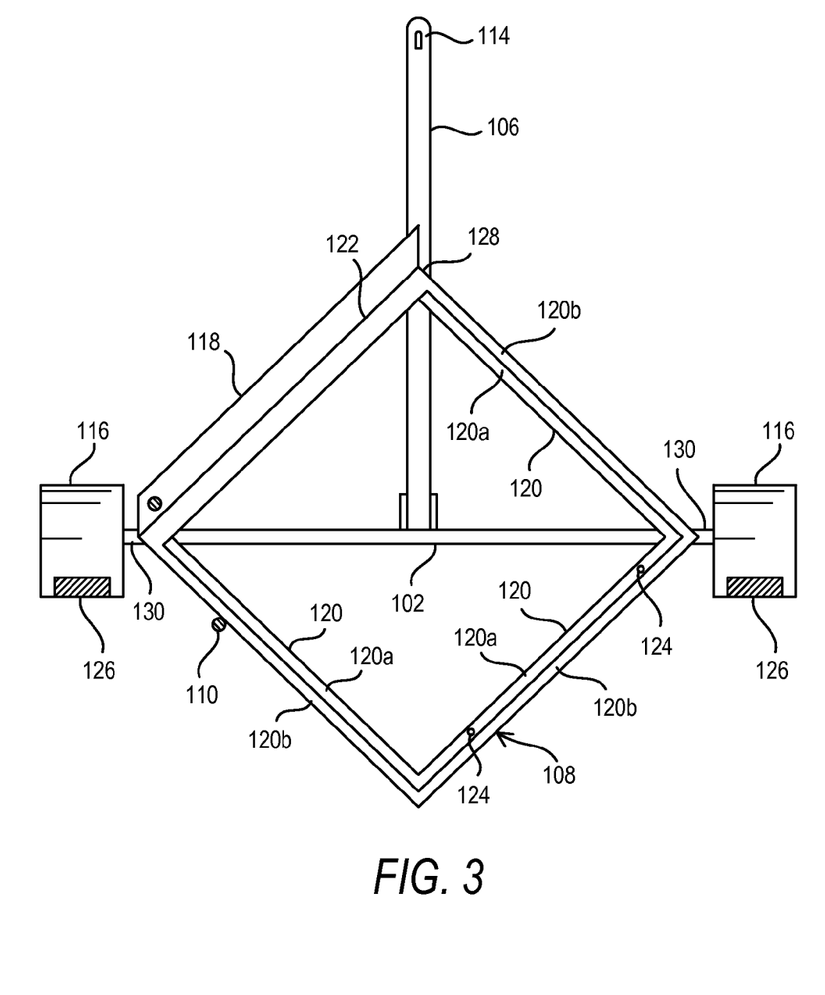
FIG. 3 is a top down view of the trailer.
Figure 4A:
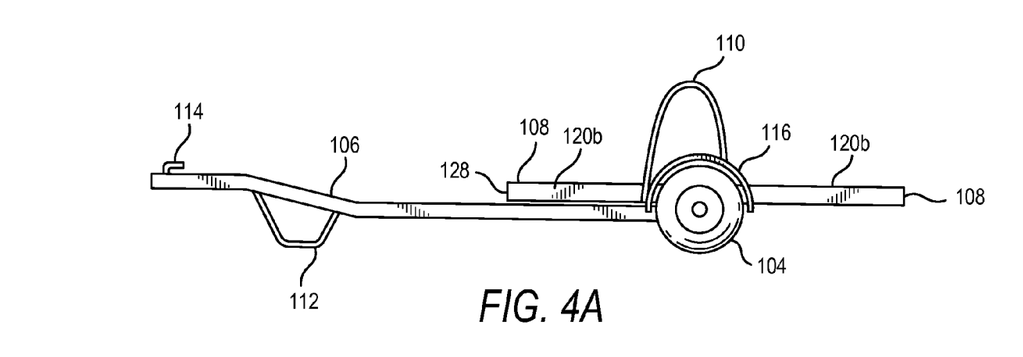
FIGS. 4A-4B are side views of the trailer.
Figure 4B:
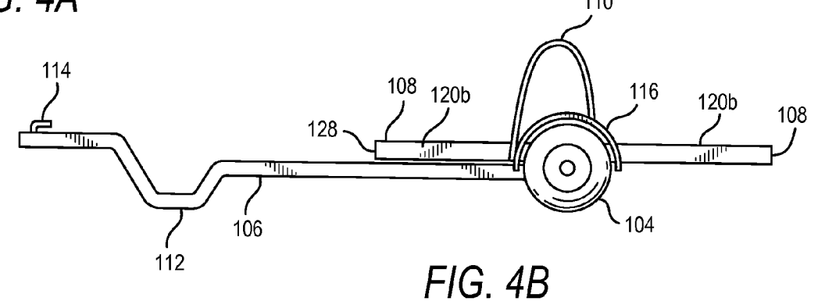
Figure 5:
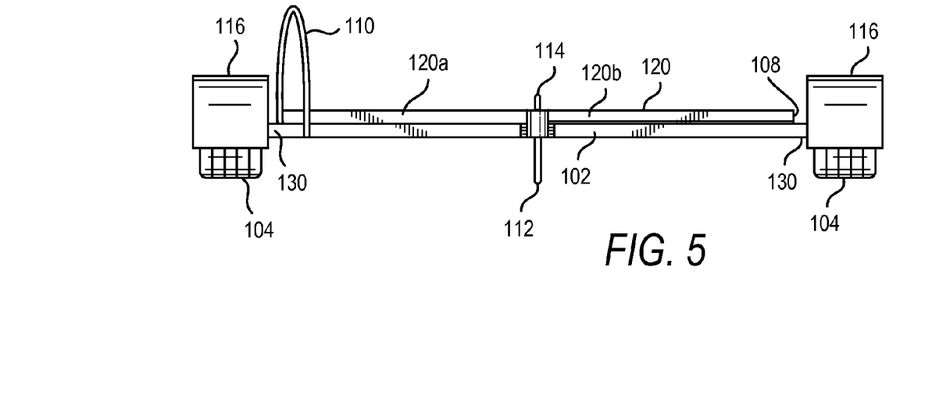
FIG. 5 is a rear view of the trailer.
Figure 6:
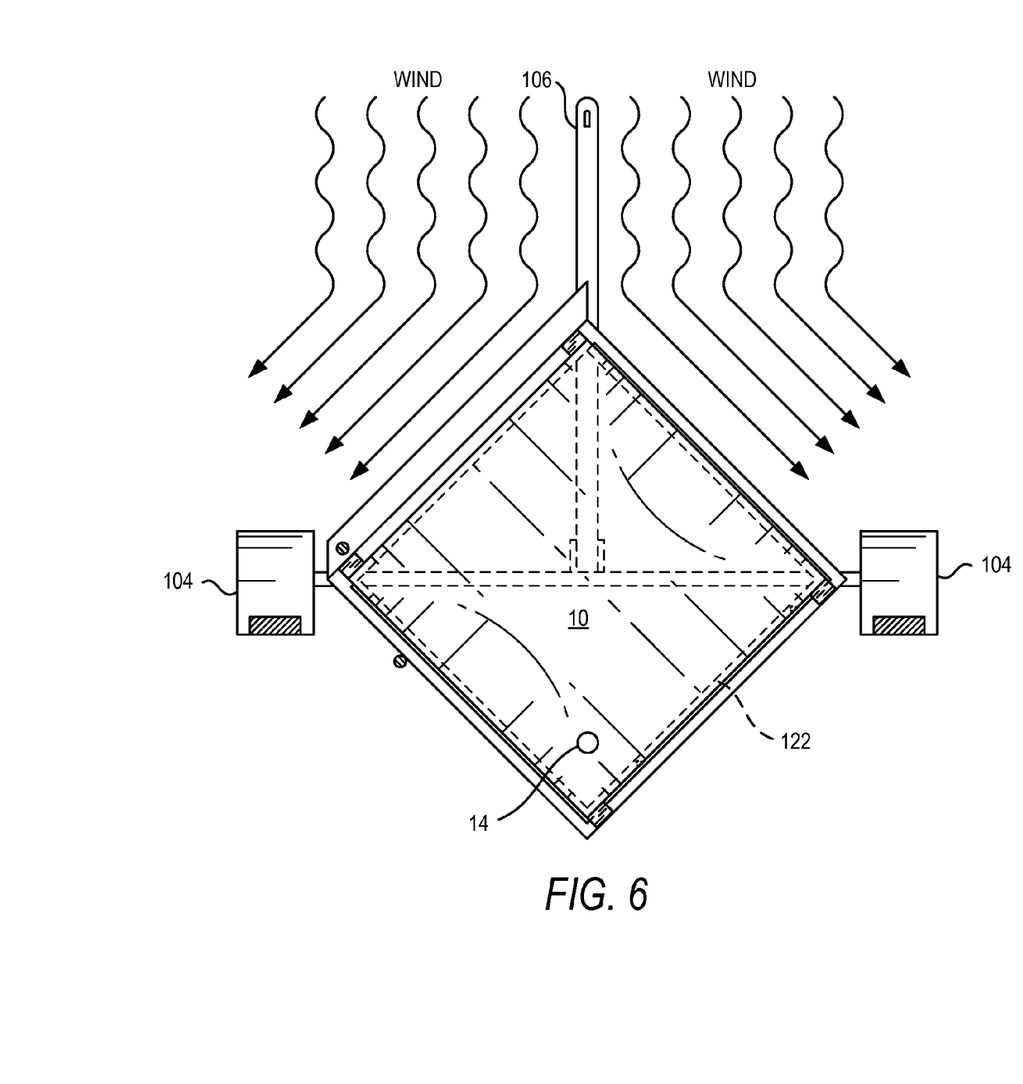
FIG. 6 is a top view of the trailer showing wind deflection direction as the trailer is being towed.

FIGS. 1A-1D show different views of a portable structure 10 where FIG. 1A is a perspective view, FIG. 1B is a front view, FIG. 1C is a side view, and FIG. 1D is a bottom view. Portable structure 10 has a hinged door 12 and a base 16 that is formed of horizontal skid plates 18 running from one side of structure 10 to the opposing side.

As shown in the FIGS. 2A-6, a trailer 100 for transporting portable structure 10 includes a central axle 102 to which are affixed wheels 104 at either end, a tow bar 106, a base frame 108, a stabilizer bar 110, a tow bar support 112, a hitch 114 and fenders 116. It should be understood that the function of tow bar support 112 can be alternatively achieved by integrating a support shape into tow bar 106 as shown in FIGS. 2B and 4B. The height of the dip in the support shape may be configured for different uses and the drawings are not drawn to scale. For example, in the case of the trailer of the present invention, the dip in the support shape may be a few inches, or just enough to keep the hitch off the ground when the bottom of the support shape is resting on the ground. This configuration will prevent dirt or other debris from collecting in the hitch, but will not interfere with road topology where it is undesirable for the bottom of the support shape to drag on the ground while being towed. In other cases, the dip may be much more pronounced to raise the level of the hitch higher off the ground. The general purpose of the support shape is to eliminate the need for a jack stand (not shown) that is common on trailers of all types.

A handle 113 may also be attached to the top of tow bar 106 to make it easier to lift tow bar 106 and place hitch 114 over the corresponding ball (not shown) extending from a vehicle. Base frame 108 holds the base of a portable structure by engaging one end of skid plates 18 formed at base 16 of portable structure 10. Base frame 108 further includes a step bar 118, bottom support members 120 that support the portable structure 10 underneath skid plates 18, top skid plate engagement element 122 and securing rods 124. Also attached to each of fenders 116 is a taillight cluster 126 housing taillights, brake lights and back-up lights that connect to the electrical system of the tow vehicle.

The T-shaped trailer components consisting of axle 102 and tow bar 106 as well as fenders 116, taillight clusters 126, wheels 104, hitch 114 and tow bar support member 112 will not be described in greater detail herein. Base frame 108 is mounted to the top of axle 102 and tow bar 106. Base frame 108 is a rectangular or square shape that has dimensions slightly exceeding the base portion of portable structure 10, including skid plates 18 that form base 16 of portable structure 10. Each component of base frame 108 making up the four sides of base frame 108 is formed of an L-shape angled component 120 such that portable structure 10 comes into contact and sits atop the lower horizontal portion 120a of each L-shape angled component 120 with opposing ends of skid plates 18 contacting the vertical side portion 120b of L-shape angled component 120 at the both ends of each skid plate 18. By having the dimensions of base frame 108 slightly exceed the dimensions of portable structure base 16, portable structure 10 fits snugly inside of base frame 108 without shifting during transport.

Base frame 108 is preferably mounted with a leading corner 128 affixed to tow bar 106. Mounting can be accomplished by bolting base frame 108 to tow bar 106, but is preferably accomplished by welding base frame 108 to tow bar 106 and axle 102. Alternatively, it can be mounted through the use of permanent rivets or bolts and nuts. With lead corner 128 affixed to tow bar 106, side corners 130 align with axle 102 inside of wheels 104. Side corners 130 of base frame 108 are also preferably mounted to axle 102 by welding, rivets or bolts. Configuring base frame 108 with respect to axle 102 and tow bar 106 as described results in portable structure 10 sitting at a 45 degree angle to leading corner 128 bisected by an axis through tow bar 106. This alignment results in natural wind flow deflection to the sides of portable structure 10. The deflection occurs at a gentle 45 degree angle as the wind hits leading corner 128 and a corresponding corner of portable structure 10. The wind then flows evenly and gently across the angled sidewalls of portable structure 10 affixed to trailer 100 as the portable structure 10 is towed on trailer 100 by a tow vehicle. The wind deflection is approximately equal on both sides and naturally stabilizes portable structure 10 during towing, particularly as compared to prior art designs where the wind hits the leading wall of portable structure 10 head-on resulting in a tendency to blow it over making trailers using such a design unstable and difficult to maneuver, particularly at highway speeds.

In addition, the angled placement design of the present invention dictates that axle 102 be wider than that of a trailer for transporting a portable structure at a position angled 90 degrees to tow bar 106. This is because the angled configuration must accommodate the diagonal dimension of a portable toilet structure which is greater than the side dimension of a portable structure 10. The use of a wider axle 102 further increases the stability of trailer 100 resulting in better handling on the road.

It should also be recognized that cross winds blowing from either side of trailer 100 will be broken at a 45 degree angle by side corners 130 in a manner similar to that described with respect to leading corner 128. Wind resistance being directed from the front or side of the trailer during towing with the design of the present invention will be greatly reduced resulting in smoother operation for trailer 100 and a significant increase in the level of safety for the occupants of the vehicle towing trailer 100, as well as others who may be occupants in vehicles on the road in the vicinity of trailer 100 during transport.

In operation, portable structure 10 is loaded onto trailer 100 by tilting it and sliding the skids of the portable toilet structure up onto and over step bar 118 into base frame 108. As can be seen in FIGS. 1A-1D, Skid plates 18 on the bottom of portable structure 10 protrude beyond the walls of structure 10. This protrusion of skid plates 18 provides a means for engaging portable structure 10 inside of base frame 108. At one side of base frame 108 is a fixed skid plate engagement element 122. The ends of skid plates 18 of portable structure 10 are positioned under plate 122. Once base 16 of portable structure 10 is positioned in base frame 108 with skid plates 18 under plate 122, the other end of skid plates 18 are secured at the opposing side of base frame 108 using securing rods 124. These rods pass through anchor holes in skid plates 18 and through aligned holes in base frame 108. The rods can be implemented in a number of ways including using screws, spring loaded rods or any other apparatus for holding skid plates 18 in place. Alternatively, a second fixed skid plate engagement element (not shown) can be locked down over the opposite ends of skid plates 18. It is also possible to implement the second fixed skid plate engagement element using a spring loaded mechanism that can be easily and quickly opened during positioning of portable structure 10 and then locked over the ends of skid plates 18. Once portable structure 10 is secured, it may be safely towed on trailer 100.

Figure 7:
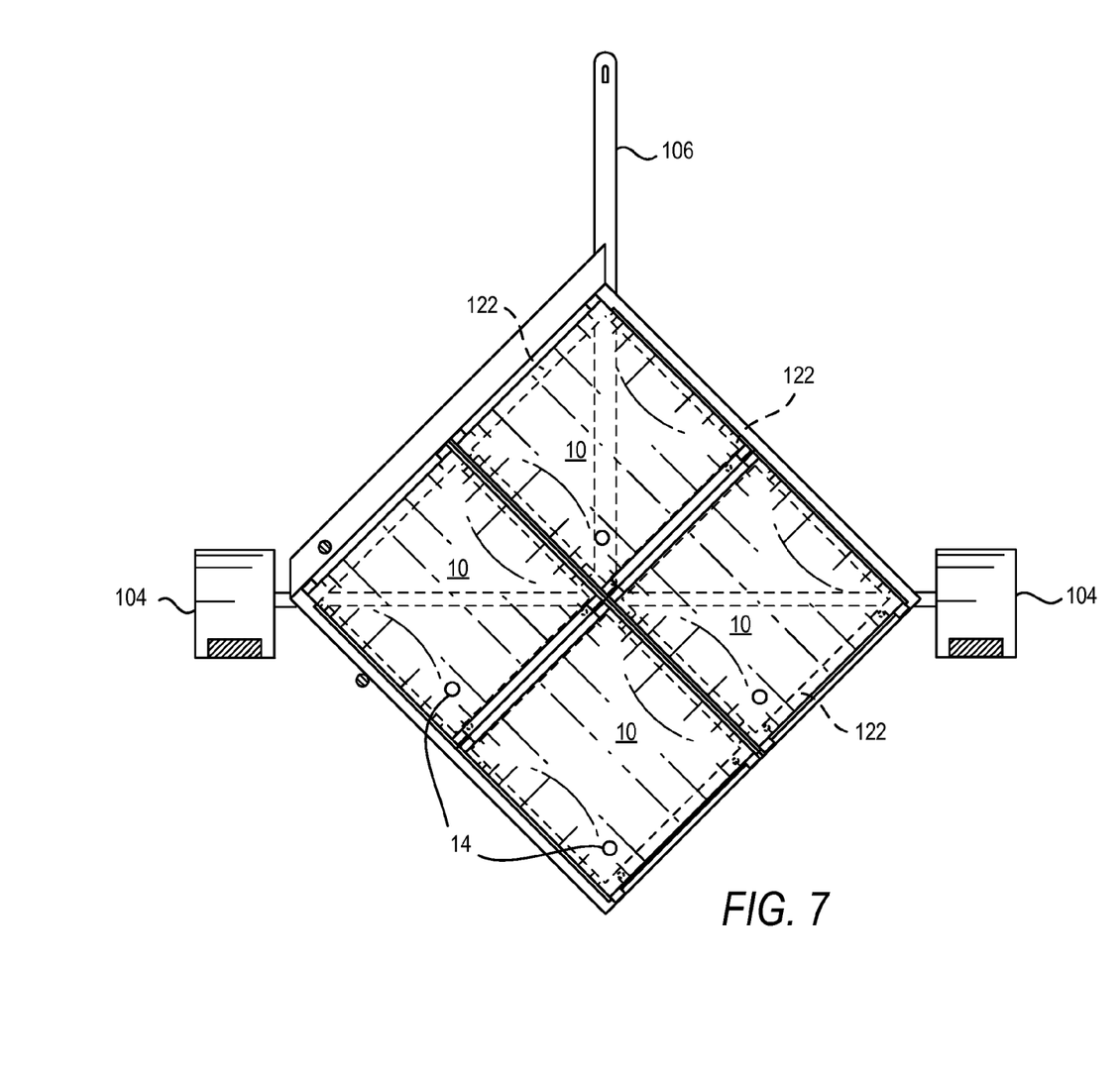
FIG. 7 is a top view of the trailer with a configuration to accommodate four portable structures.

It is to be understood that the above descriptions and drawings are only for illustrating variations of the present invention and are not intended to limit the scope thereof. Any variation or derivation from the above description and drawings are included in the scope of the present invention. For example, FIG. 7 shows a configuration of a trailer that can accommodate 4 portable structures. In such a configuration, the size of the underlying trailer frame could be made larger while maintaining the basic "diamond" shape. To accommodate the 3 additional portable structures, the opposing sides of the base frame could be lengthened to form an elongated rectangular base frame with the ability to hold two portable structures, while a second elongated base frame could be positioned adjacent to and behind the first base frame to accommodate two additional portable structures. In such a configuration, the trailer width and axle would need to be made at least as wide as the diagonal dimension of two portable structures. Additional elongated base frames could be added to a longer trailer to increase the number of portable structures to be carried.

What is claimed is:

1. A trailer for transporting a portable structure comprising:
   a first frame including;
      an axle with a wheel affixed at each end; and a tow bar affixed to the axle at one end between the wheels and having a hitch at the other end for removably coupling the trailer to a tow vehicle;
   a second frame comprising a supporting component onto which a generally rectangular portable toilet structure is positioned in an upright position for transport and a second component holding the portable toilet structure in place on the trailer; wherein, the second frame is affixed to the first frame in a position on the first frame such that a leading corner formed in the second frame is positioned in substantial alignment with an axis through the length of the tow bar, so that a corner of the portable toilet structure is centered and faces forward on said trailer.

2. The trailer of claim 1 further comprising a securing mechanism for retaining the portable toilet structure in place.

3. The trailer of claim 2 wherein the securing mechanism engages a base portion of the portable toilet structure.

4. The trailer of claim 3 wherein the securing mechanism engages an end portion of at least one skid plate on the portable toilet structure that is part of the base of the portable toilet structure and extends beyond an exterior surface of the portable structure.

5. The trailer of claim 1 such that each of the members of the second frame that form the leading corner are aligned to be substantially at a 45 degree angle with the axis through the length of the tow bar, for presenting a corner of said portable toilet structure into wind when said trailer is transported.

6. The trailer of claim 1 further comprising at least one stabiliser bar attached to one of either the first frame or the second frame for supporting the upper portion of the portable structure by coming into contact with an exterior surface of the portable structure.

7. The trailer of claim 1 wherein the tow bar further comprises a forward stand-shaped portion of the tow bar formed to support the trailer while maintaining the remaining portion of the tow bar in an orientation that is substantially parallel to the ground.

8. The trailer of claim 1 further comprising a handle affixed to the tow bar for grasping the tow bar, and raising or lowering the trailer.

9. The trailer of claim 1 in which said portable toilet structure is permanently mounted to said second frame of said trailer.

* * * * *